United States Patent [19]

Kayama et al.

[11] Patent Number: 5,548,597
[45] Date of Patent: Aug. 20, 1996

[54] FAILURE DIAGNOSIS APPARATUS AND A METHOD THEREOF

[75] Inventors: Masahiro Kayama; Yasuo Morooka; Yoichi Sugita; Masaaki Nakajima, all of Hitachi, Japan

[73] Assignee: Hitachi, Ltd., Tokyo, Japan

[21] Appl. No.: 322,557

[22] Filed: Oct. 13, 1994

[30] Foreign Application Priority Data

Oct. 13, 1993 [JP] Japan .................................. 5-255462

[51] Int. Cl.⁶ .................................................. G06F 11/00
[52] U.S. Cl. ........................ 371/25.1; 371/28; 395/183.06
[58] Field of Search ............................... 371/26, 25.1, 27, 371/28; 364/424.01, 424.03, 351.01; 395/183.02, 183.06, 183.07

[56] References Cited

U.S. PATENT DOCUMENTS 5,148,378  11/1990  Shibayama .............................. 364/571

Primary Examiner—Vincent P. Canney
Attorney, Agent, or Firm—Antonelli, Terry, Stout & Kraus

[57] ABSTRACT

A failure diagnosis apparatus for a control system at which plural sensors are provided, comprises a means for extracting correlations among output signals from the predetermined groups of the sensors based on the output signals in the normal operations of the control system by such a means as a quantization method of quantizing a signal space, a means for making up an abnormal degree of the output signals from each predetermined group of the sensors by comparing output signals to be examined from each predetermined group of the sensors and the correlation corresponding to the group of the sensors, and a means for estimating the reliability of each sensor by using the abnormal degrees and for identifying the sensor outputting an abnormal signal.

12 Claims, 8 Drawing Sheets

| TIME SERIES NUMBER | DETECTED VALUE | | | | |
|---|---|---|---|---|---|
| | SENSOR 1 | SENSOR 2 | SENSOR 3 | — | SENSOR n |
| 1 | 0.1584 | 0.2681 | 0.6951 | — | 0.2544 |
| 2 | 0.0369 | 0.3281 | 0.5577 | — | 0.9852 |
| 3 | 0.8571 | 0.1135 | 0.1265 | — | 0.3654 |
| 4 | 0.6981 | 0.4953 | 0.8720 | — | 0.2577 |
| 5 | 0.0235 | 0.8751 | 0.9611 | — | 0.2544 |
| ⋮ | ⋮ | ⋮ | ⋮ | | ⋮ |
| m | 0.4697 | 0.3577 | 0.4100 | | 0.5748 |

…

FAILURE DIAGNOSIS APPARATUS AND A METHOD THEREOF

BACKGROUND OF THE INVENTION

1. Field of the Invention

The present invention relates to a diagnosis apparatus and a method thereof for a control system having a plurality of sensors in a steel plant, an electric power plant, a general industry and so on, particularly to a diagnosis apparatus and a method thereof preferable to determining degraded sensors of which the measurement accuracy is growing worse due to aged deterioration, indicating apparent normal indication of each sensor.

2. Description of the Related Art

One of conventional sensor diagnosis methods is a diagnosis method of detecting a degraded sensor by using the indicative magnitude relation naturally existing among sensors as described in "Diagnosis by Using An Immune Network Information Model (in Japanese)", by Ishida, Proc. of A Symposium on The Third Autonomous Distributed System, January, 1992. Further, as described in Japanese Patent Application Laid-Open No.35329/1993, another conventional sensor diagnosis method is a method of detecting a degraded sensor by comparing an output signal of the sensor with the predetermined functional relation among output signals from sensors.

The above-mentioned conventional methods have the following problem. That is, although a degraded sensor can be easily detected by the methods if an object control system is so simple that the indicative magnitude relation or the functional relation among output signals from sensors is clearly determined, the methods is not applicable in a case where the indicative magnitude relation or the functional relation are complicated and hardly extracted.

SUMMARY OF THE INVENTION

Objects of the Invention

The present invention has been achieved in consideration of the above-described problems, and is aimed at providing a diagnosis apparatus and a method thereof which easily detects degraded sensors in a number of sensors provided within a control system even if the correlations existing among output signals from the sensors are complicated.

Methods Solving the Problems

The present invention offers a failure diagnosis method comprising the steps of storing signals output from a plurality of sensors provided at a control object, making up groups of quantization vectors obtained as feature vectors representing correlations among the signals output from each one of the predetermined groups by using the signals stored in a memorizing means, storing each group of quantization vectors corresponding to each group of sensors, obtaining an abnormal degree of each group of sensors by comparing present signals of each group of sensors and the group of quantization vectors corresponding to each group of sensors and diagnosing degraded sensors in the plurality of sensors based on the obtained abnormal degrees.

A means for making up the groups of quantization vectors includes a quantization network comprising a plurality of quantization neurons and synapses connecting the quantization neurons to each other corresponding to each group of the sensors. A weight renewal means renovates weights of the synapses by using the signals input in time series from each group of the sensors.

Sets of weights of the synapses determined to each quantization network are defined as quantization vectors. The made up quantization vectors are stored in a correlation memorizing means.

An abnormal degree evaluation means searches the quantization vector nearest to a state vector formed by present signals of each group of sensors and obtains the abnormal degree of the group of sensors based on a distance between the searched quantization vector and the state vector of the present signals.

A means for diagnosing degraded sensors determines a reliability of each one of sensors based on the abnormal degrees obtained by the abnormal degree evaluation means.

DETAILED DESCRIPTION OF THE PREFERRED EMBODIMENTS

Hereinafter, details of the present invention are explained based on embodiments referring to drawings. In the embodiments, though each one of the groups of sensors is composed of a pair of sensors, operations of the embodiments are the same as those of an apparatus or a method having the constitution wherein each of the groups of sensor is composed of more than two sensors.

Figure 1:
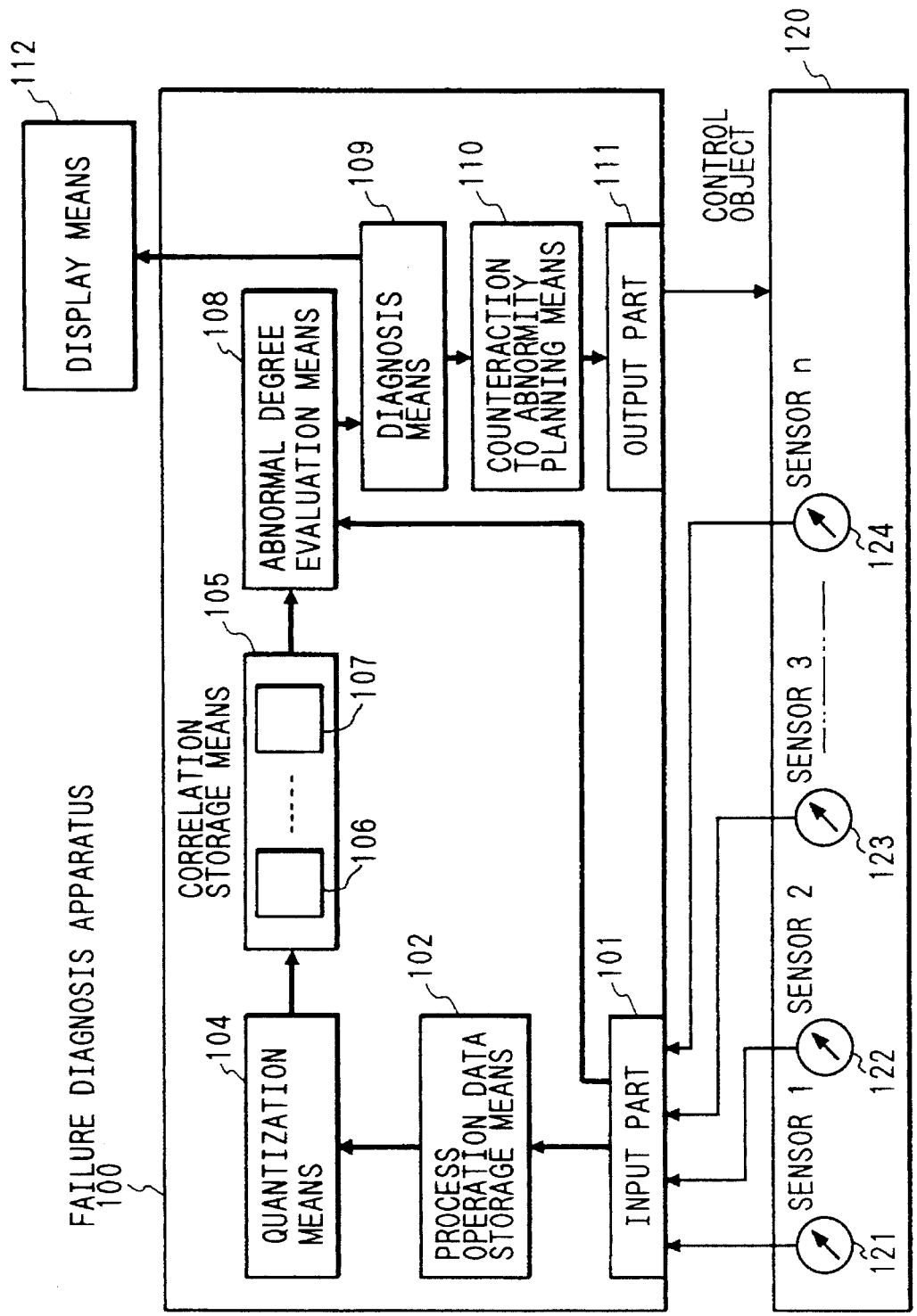
FIG. 1 shows the constitution of a failure diagnosis apparatus of the present invention.
Figures 2, 4:
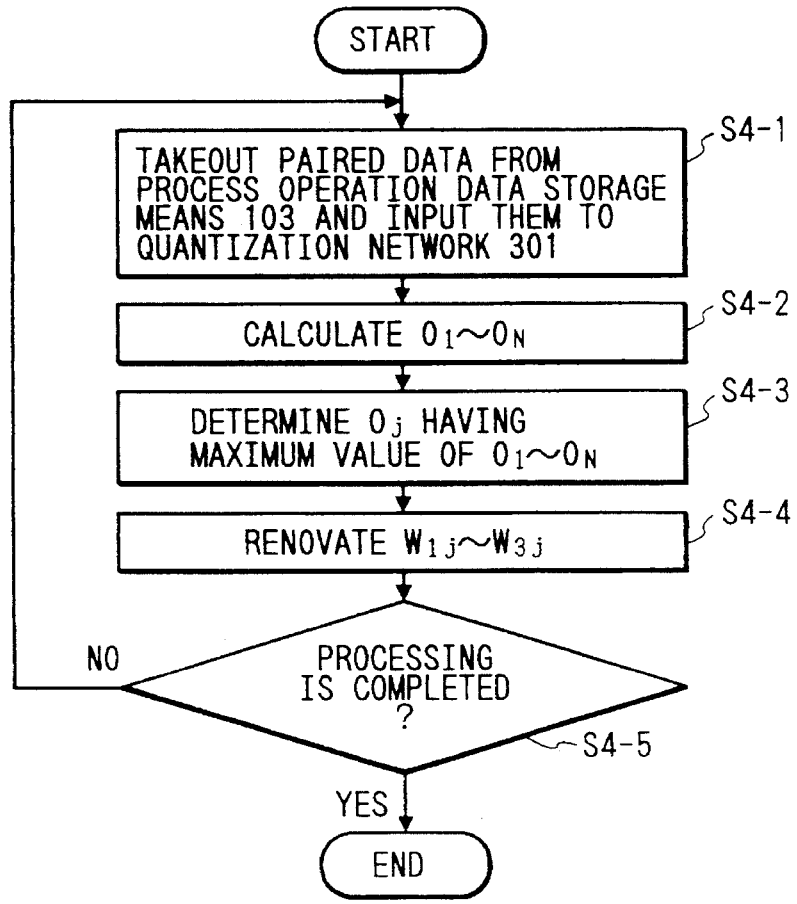
FIG. 2 shows the constitution of a process operation data storage means in the failure diagnosis apparatus.
FIG. 4 shows a process flow of a quantization processing means in the quantization means.

FIG. 1 shows the constitution of a failure diagnosis apparatus 100. A process operation data storage means 102 stores output signals from n sensors (sensor 1, sensor 2, sensor 3, ..., sensor n) provided at a control object 120 via an input part corresponding to operation timing of the control object 120. FIG. 2 shows an example structure of the data stored in the process operation data storage means 102 and the contents of data from a sensor 1 to a sensor n being stored in time series until m steps occur.

Figure 3:
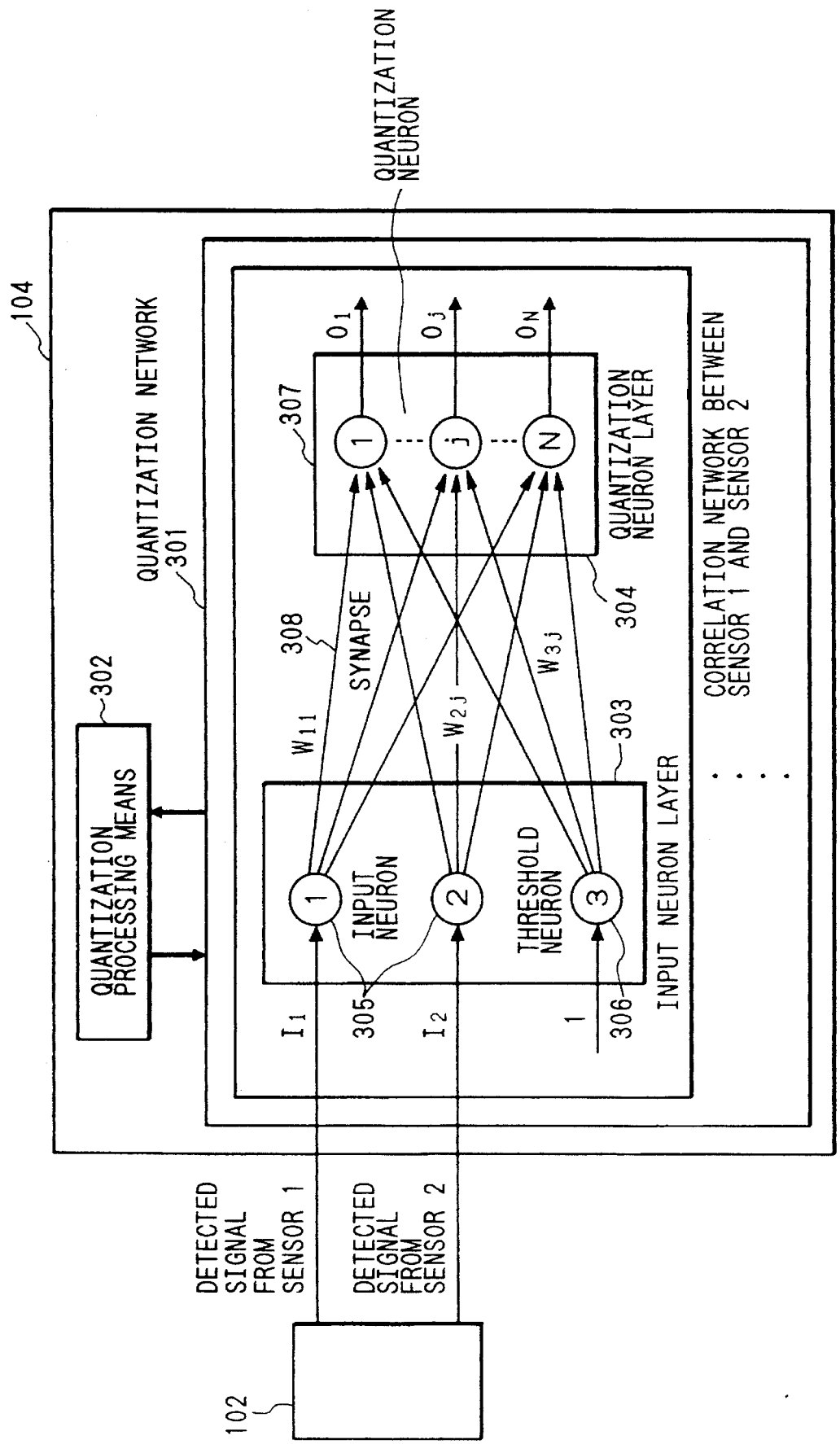
FIG. 3 shows the constitution of a quantization means in the failure diagnosis apparatus.

A quantization means shown in FIG. 3 extracts the correlations existing among output signals from the sensors by using a data base stored in the process operation data storage means 102. The extracted correlations to each pair of the sensors are stored in sensor correlation storage means 106–107 in a correlation storage means 105. An abnormal degree evaluation means 108 obtains a distance between a state vector formed by present output signals from each pair of the sensors and the corresponding quantization vector representing the correlation obtained in the normal states of each pair of the sensors 1–n by comparing the data stored in the correlation storage means 105 and present output signals of each pair of the sensors taken in from the input part 101. A diagnosis means 109 judges whether the present output signal from each sensor is abnormal, based on the above-mentioned distances obtained to each pair of the sensors and the corresponding present output signals.

Then, if any abnormality is detected, the diagnosis means 109 specifies a sensor indicating the abnormal value and displays the sensor number, etc. on a display means 112. And a counteraction to abnormity planning means 110 is invoked as occasion demands, and an output signal from the counteraction to abnormity planning means 110 is sent to the control object 120.

FIG. 3 shows an example constitution of the quantization means 104, which comprises a quantization network 301 and a quantization processing means 302. Although a correlation network in the quantization network 301 is provided for each pair of the sensors, and an example of the quantization network for the pair of the sensors 1 and 2 is shown in FIG. 3, it is possible that a plurality of pairs of the sensors have commonly one correlation network. The correlation network comprises an input layer 303 composed of input neurons 305 to respective neurons of which a detected signal $I_1$ from the sensor 1 and the detected signal $I_2$ from the sensor 2 are input and a threshold neuron 306 outputting a constant value (1 is set in FIG. 3), and a quantization neuron layer 304 composed of a plurality of quantization neurons 307, and further synapses 308 transmitting signals between the input layer 303 and the quantization neuron layer 304.

Results $O_j$ (j=1–N) obtained by Eq.1 (given ahead) are output from the quantization neuron layer 304 to the quantization processing means 302 with the paired weight values of the synapses 308 connected to each of the quantization neuron 307.

$$O_j = \sum_{i=1}^{3} W_{ij} = I_i, \quad (j = 1 - N) \tag{1}$$

In FIG. 4, a process flow chart executed by the quantization processing means is shown. At the step S4-1, the data corresponding to each pair of the sensors are selected from the process operation data storage means 102. In the case of obtaining a correlation between the process operation data of the sensors 1 and 2, pairs of data (0.1584, 0.2681) of the 1st step of the time series data, (0.0369, 0.3281) of the 2nd step of the time series data and so on shown in FIG. 2 are selected and input to the correlation network in order. At the step S4-2, output values of $O_1$–$O_N$ are obtained by using Eq.1 for each quantization neuron 307. At the step S4-3, the quantization neuron having the maximum value of the output values $O_1$–$O_N$ is searched. In case the output value $O_j$ is the maximum value, the paired weights $(W_{1j}, W_{3j})$ corresponding to the neuron j are renovated. Learning of the correlation network is executed by renovating the paired weights $(W_{ij}, W_{2j})$ of the synapses corresponding to the input neurons 305 by using Eq.2 (given ahead) and the weights $W_{3j}$ of the synapse corresponding to the threshold neuron 306 by using Eq.3 (given ahead).

$$\dot{W}_{ij} = W_{ij} + \alpha(I_i - W_{ij}), \quad (i = 1, 2) \tag{2}$$

$$\dot{W}_{3j} = -\left(\sum_{i=1}^{2} W_{ij}^2\right)/2 \tag{3}$$

, where $\alpha$ is a constant value. The method for renovating weights of the synapses is to execute the process of increasing the correlation between the vector $(W_{1j}, W_{2j})$ and the vector $(I_1, I_2)$ and such a renovation method is not restricted to method based on Eqs.2 and 3.

At the step S4-5 of completing the process, the process is completed after the predetermined number of repeating procedures from the step S4-1 to the step S4-4 are finished, or after all of the weight renovation amounts of the synapses come under the predetermined value to one of the pairs of data taken in from the process operation data storage means 102. If the process is not completed, the process goes back to the step S4-1 and the above-mentioned procedures are repeated by taking in the pair of data in succession. After completing the process, m pairs of the data from the sensors are represented by N pairs of the synapse weights to the quantization neurons.

Although the data stored in the process operation data storage means 102 are used in the quantization means 104 of the embodiment, it is possible to use the signals output from the sensors by taking in signals in real time in succession.

Figure 5:
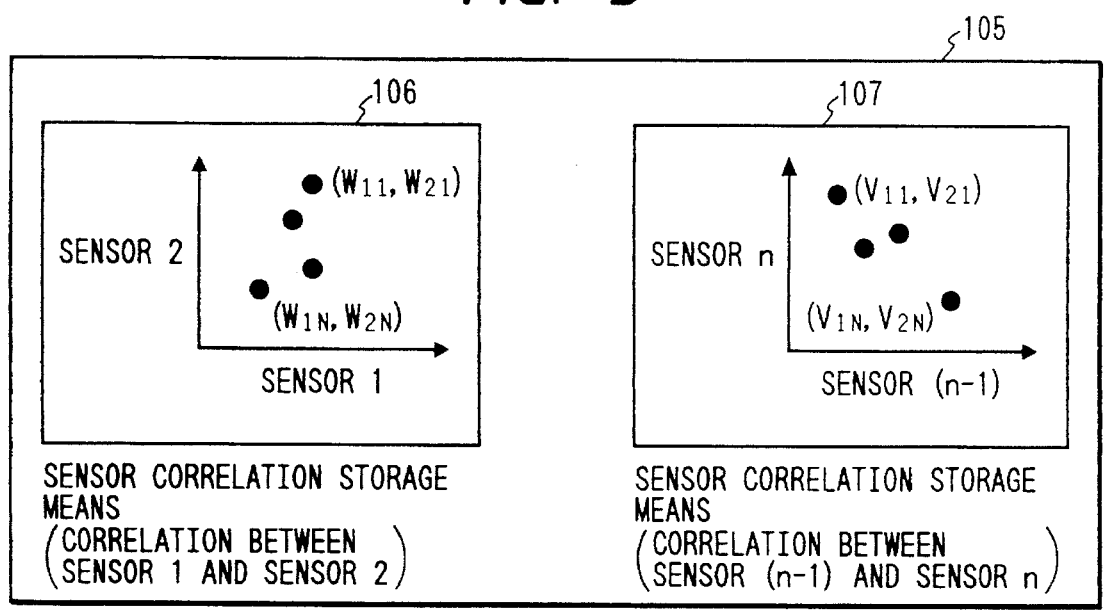
FIG. 5 shows the constitution of a correlation storage means in the failure diagnosis apparatus.

In FIG. 5, the constitution of the correlation storage means 105 is shown. The correlation storage means 105 stores the processed results of the quantization processing means 302. In the sensor correlation storage means 106 of FIG. 5, the correlation between the output signals from the sensors 1 and 2 is stored as quantization vectors (a set of paired synapse weights $(W_{ij}, W_{2j})$, j=1, . . . , N). The sensor correlation storage means 107 stores the correlation between the output signals from the sensors n and (n–1) as quantization vectors represented by a set of paired synapse weights $(V_{1j}, V_{2j})$. Although the sensor correlation storage means 106, 107 are prepared for all of the pairs of sensors in the embodiment, the sensor correlation storage means can be excluded for the pair of sensors of which the output signals apparently have no correlation to each other.

Then, it can be judged that each of the sensors outputs a normal signal if the state vector represented by each pair of present output signals from the sensors is found to be near to one of the quantization vectors, in mapping the state vector of a pair of the present output signals on a vector space of the sensor correlation storage means prepared corresponding to each pair of sensors.

Figure 6:
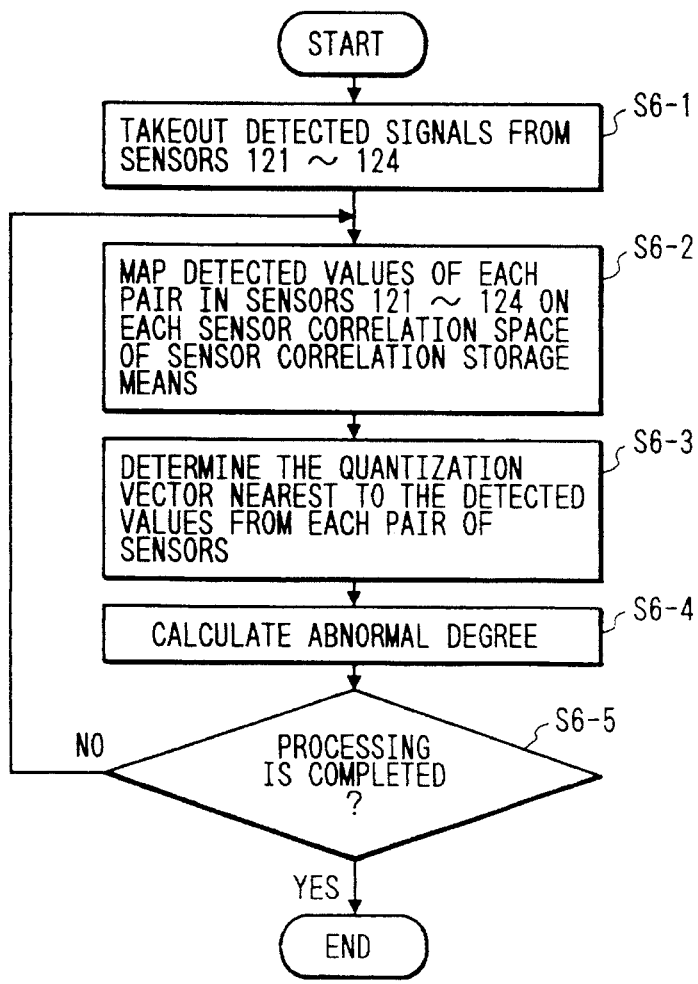
FIG. 6 shows a process flow of an abnormal degree evaluation processing means.

In FIG. 6, the process for evaluating an abnormal degree of each pair of sensors is shown by a flow chart. The abnormal degree is obtained from the results of a mutual diagnosis as to how normally a sensor 2 operates, being inspected from a sensor 1, and conversely how normally a sensor 1 operates, being inspected from a sensor 2, in the case of the paired sensors 1 and 2. And the process of obtaining the abnormal degree is explained in the following.

At the step S6-1, the present output signals from the sensors 1–n are taken in via the input part 101. At the step S6-2, the output signals from each pair of sensors are mapped as a state vector on a vector space of the sensor correlation storage means prepared corresponding to each pair of sensors. In the case of the paired sensors 1 and 2, the state vector of the present output signals is mapped on the vector space of the sensor correlation storage means 106. At the step S6-3, the quantization vector nearest to each state vector of the present output signals mapped on the vector space of each sensor correlation storage means is searched. And at the step S6-4, the abnormal degree of each paired sensors is evaluated based on a distance between the mapped state vector of the present output signals and the corresponding searched quantization vector nearest to the mapped state vector of the present output signals.

The abnormal degree is obtained as follows. Letting the coordinates of the mapped state vector of the present output signals be (X, Y), and that of the quantization vector nearest to the mapped state vector be $(W_x, W_y)$, the abnormal degree U is obtained by Eq.4.

$$U = F[(X-W_X)^2 + (Y-W_Y)^2 - \beta^2] \quad (4)$$

, where $f(X)=X$ $(X \geq 0)$, $f(X)=0$ $(X<0)$.

Then, $\beta$ is an offset value, and the abnormal degree U is O and the output signals are judged to be normal if the point (x, Y) is inside the point $(W_X, W_Y)$. If the point (x, Y) is outside the point $(W_X, W_Y)$, the abnormal degree U has the value proportional to the distance between the point (x, Y) and the point $(W_X, W_Y)$.

At the step S6-5, the process is completed if the abnormal degrees are obtained for all of the paired sensors whose correlations are stored in the sensor correlation storage means. If the process is not completed, the procedures from the step S6-2 to the step S6-4 are repeated. By the above-mentioned process, the abnormal degree for each pair of sensors is quantified as the value of U.

Figure 7:
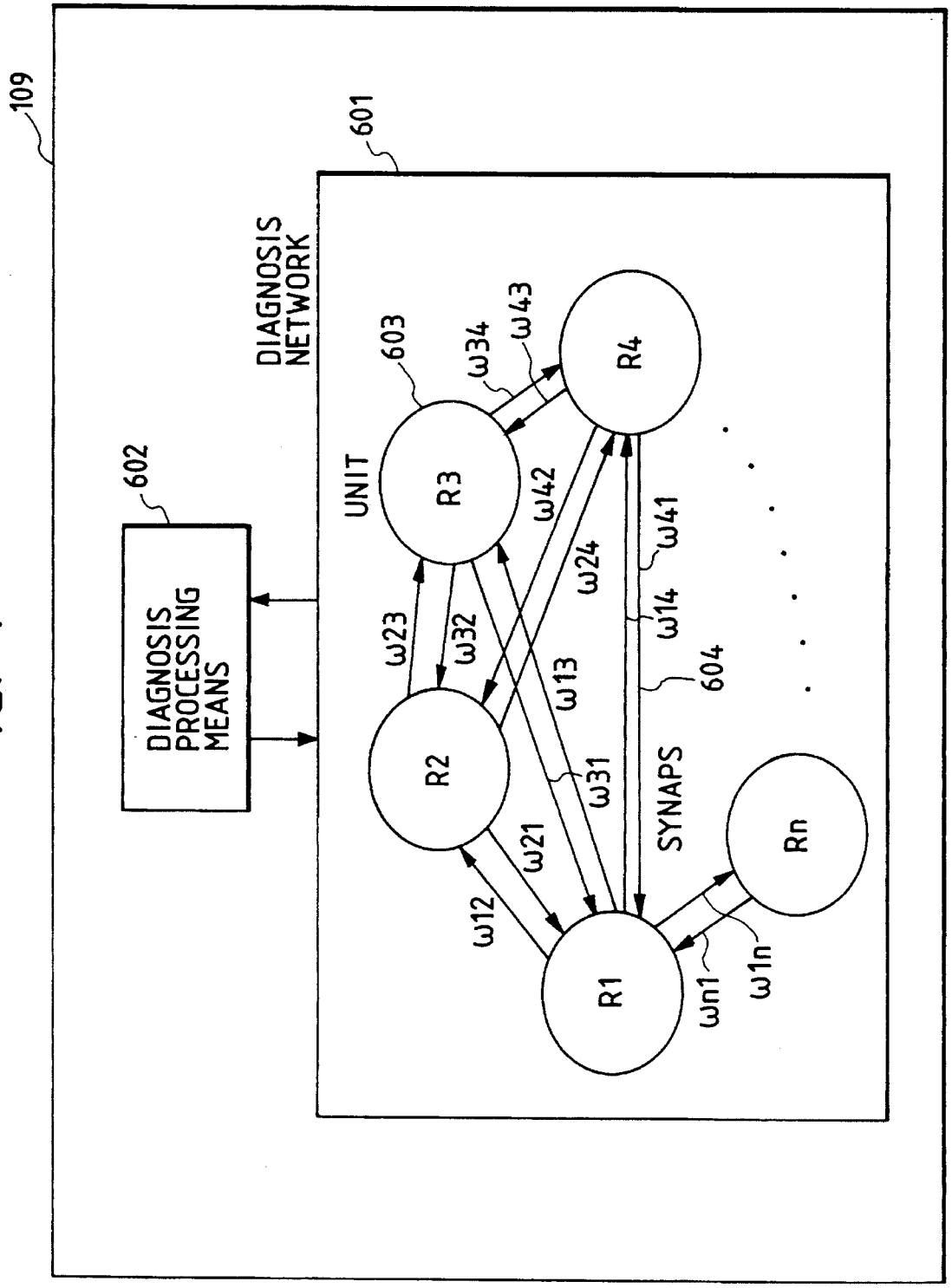
FIG. 7 shows the constitution of a diagnosis means in the failure diagnosis apparatus.

FIG. 7 shows the constitution of the diagnosis means 109 comprising a diagnosis network 601 and a diagnosis processing means 602, which determines abnormal sensors by using the abnormal degrees obtained for the pairs of sensors. The diagnosis network 601 is composed of units 603 corresponding to the sensors and synapses 604 connecting the units to each other. Reliability $R_i$ (i=1, ..., n) of each unit indicates reliability of each sensor. Then, the reliability $R_i$ is output as 1 if the sensor is normal, and the reliability $R_i$ is output as 0 if the sensor is deteriorated.

Synapse weights ω allotted to the synapses 604 of the diagnosis network are obtained based on the abnormal degree U corresponding to the paired sensors i and j by Eq.5.

$$\omega = g(1-\gamma U) \quad (5)$$

, where $g(X)=X$ $(X \geq -1)$, $g(X)=-1$ $(X<-1)$.

In Eq.5, the synapse weight $\omega_{ij}$ is 1 if the sensors i and j recognize the other part of each other is normal. The synapse weight $\omega_{ij}$ decreases as the abnormal degree U increases and has the saturated value −1 if exceeding a definite value.

In FIG. 7, if a unit is connected to another unit by synapses, the pair of the corresponding sensors has correlation. If a synapse is excluded to some pair of the units, it means that the pair of the corresponding sensors has no correlation.

Figure 8:
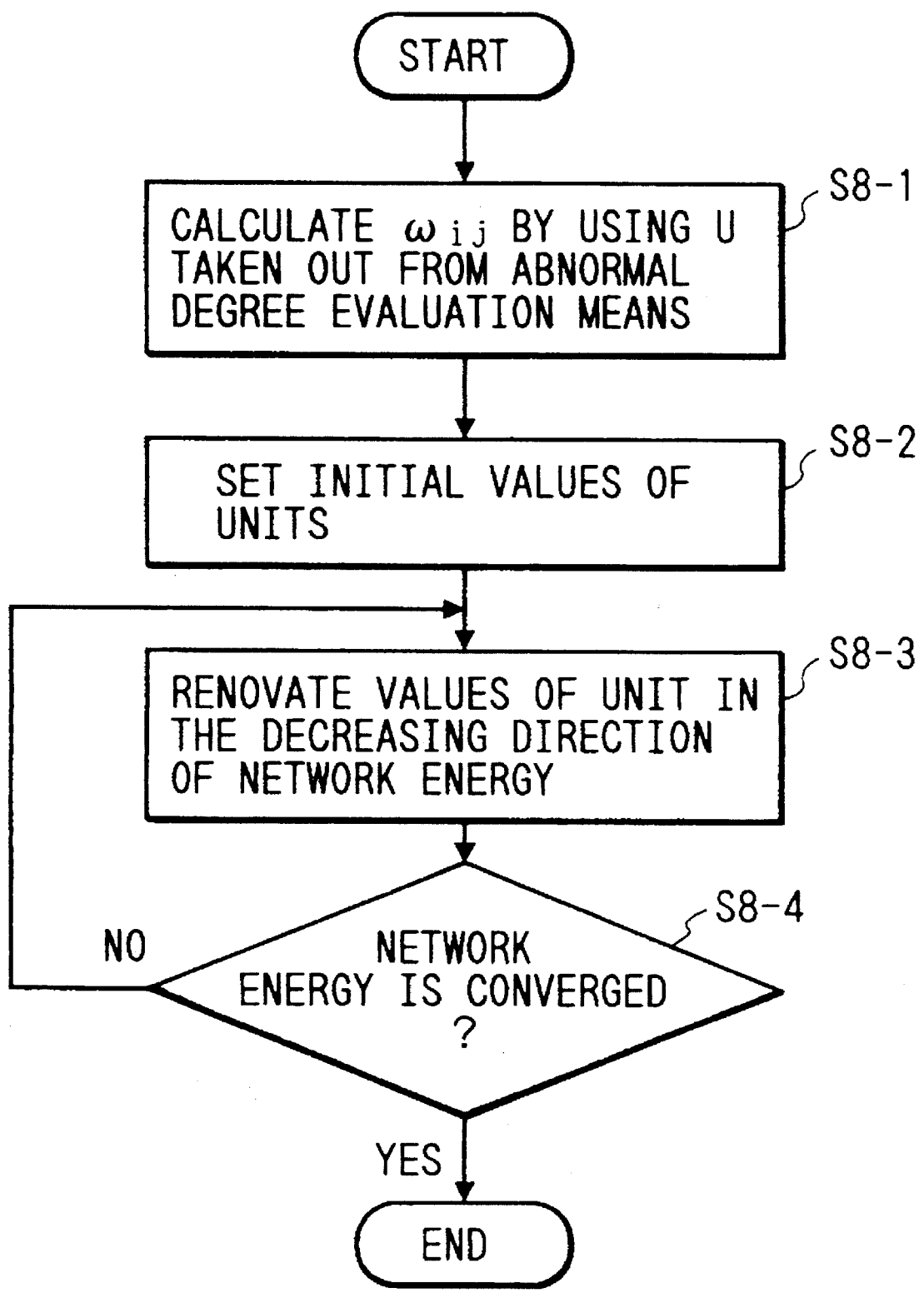
FIG. 8 shows a process flow of a diagnosis processing means.

In FIG. 8, the process executed by the diagnosis processing means 602 of the diagnosis means 109 is shown by a flow chart.

At the step S8-1, the abnormal degree U obtained by the abnormal degree evaluation means 108 is taken in for each paired sensors and the synapse weight $\omega_{ij}$ of the diagnosis network is calculated by Eq.5.

At the step S8-2, the initial value of the unit reliability $R_i$ is allotted to each unit. Since the initial states of the sensors can be regarded as normal, the value 1 is allotted to the reliability $R_i$ (i=1, ..., n). In another way of initialization, the value 1 or 0 is allotted to the units at random.

At the step S8-3, the reliability $R_i$ of the units 603 is renovated in the decreasing direction of the energy obtained by Eq.6 (given ahead). Firstly, changed energy is obtained by inverting the value (from 1 to 0, or from 0 to 1) of one unit selected from the units 603. Then, if the changed energy decreases to be less than the past energy, the inverted value of the reliability $R_i$ of the selected unit is kept. Otherwise, the inverted value of the reliability of the selected unit is put back to the past value since the inversion of the reliability value is not effective.

$$E = -(1/2) \sum_{i=1}^{n} \sum_{j=1}^{n} \omega^*_{ij} R_i R_j + (1/2) \sum_{i=1}^{n} \left[ \sum_{j=1}^{n} (\omega_{ij} + 1) \right] R_i, \quad (6)$$

where $\omega^*_{ij} = \omega_{ij} + \omega_{ji}$, $\omega_{ii} = 0$ $(i = 1, ..., n)$.

At the step S8-4, if the energy of the diagnosis network 601 converges, the process is completed. The convergence of the diagnosis network is generally determined by judging whether the energy of the network can not be reduced by inverting the value of reliability $R_i$ of any one in the units 603. In another convergence determining method, the process is brought to the end if the repetition number of the converging procedures reaches a predetermined number. If it is determined that the diagnosis network 601 does not converge, the step S8-3 is repeated.

Alternatively to the above-mentioned renewal method of the reliability $R_i$ based on Eq.6, a renewal method by examining the change of sign of E' (i) calculated by Eq.7 (given ahead) is also usable. That is, if the sign of E' (i) calculated to a selected unit i is positive, the reliability Ri is set as 1 (the unit is normal), and if the sign of the calculated E' (i) is negative, the reliability $R_i$ is set as 0. If the sign of the calculated E' (i) is zero, the present reliability $R_i$ is kept.

$$E'(i) = \sum_{j=1}^{n} \omega_{ji} R_j + \sum_{j=1}^{n} \omega_{ij} R_j - (1/2) \sum_{j=1}^{n} (\omega_{ij} + 1) \quad (7)$$

The diagnosis results obtained by the process shown in FIG. 8 are displayed to a user by the display means 112. The contents to be displayed are the occurrence of sensor abnormity by messages, etc., the numbers of abnormal sensors and so on if the display means is a means with a screen. If the display means is an alarm lamp indicating system, the lamps corresponding to abnormal sensors are lighted.

Further, in case some sensors are diagnosed to be abnormal, the counteraction to abnormity planning means 110 is invoked and a counteraction to the sensor abnormity is executed. As a counteraction to sensor abnormity, a procedure to stop operations of the component related with the abnormal sensor is executed, or control methods by a preset contingency procedures neglecting the signals output from the abnormal sensor are determined and output to the control object 120 via the output part 111.

Although the reliability $R_i$ is defined as 1 or 0 and the reliability of each sensor is specified as normal or abnormal in the embodiment, the sensor having the highest reliability or the sensor having a high probability of failure can be specified by a method of determining the reliability $R_i$ as a continuous value between 0 and 1. In the method, the reliability $R_i$ minimizing the energy E is obtained by such means as adding or subtracting a small definite amount to or from the energy E.

In the embodiment, the failure diagnosis apparatus 100 processes the first process mode of processing the output signals from the sensors until establishing the correlation storage means 105 and the second process mode of diagnosing the sensors and planning the counteractions to the sensor abnormity by using the processed results in the correlation storage means 105. In another embodiment, the first process mode is realized by another apparatus, and the failure diagnosis apparatus 100 receives the processed results in the correlation storage means 105 and executes the second process mode.

Although the embodiment deals with only the output signals from the sensors as the input data, it is possible to use state variables which can be estimated as the input data in such a case where a sensor is included in a feedback loop and the abnormity of the sensor can not be clearly and independently observed. Further, it is also possible to use a group of more than three output signals as the input data into the quantization means 104 by executing a multi-dimensional process in the correlation storage means 105 and the abnormal degree evaluation means 108.

Figure 9:
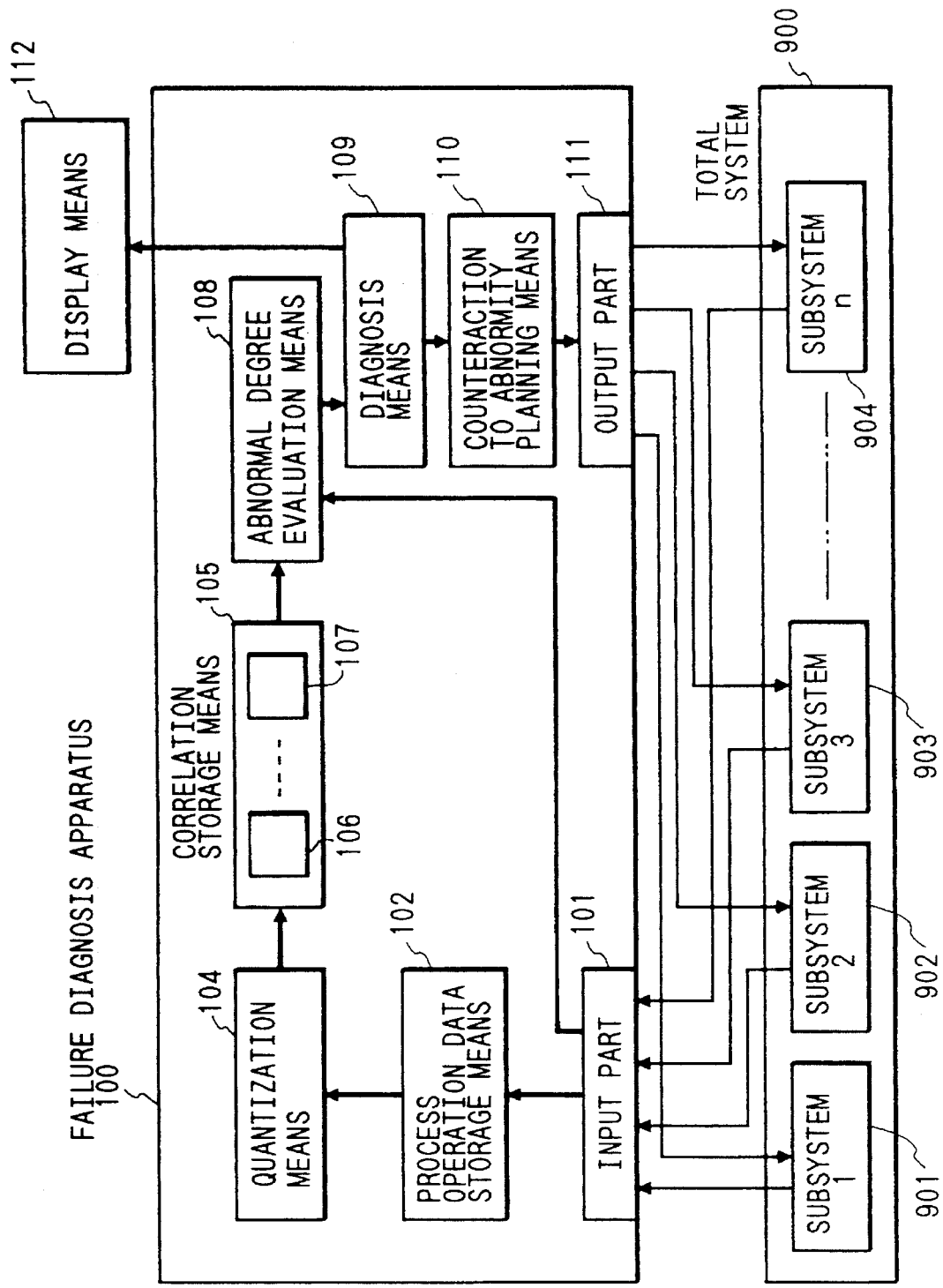
FIG. 9 shows an embodiment of a failure diagnosis apparatus for a distributed system.

In FIG. 9, another embodiment wherein an object to be diagnosed is a total system composed of a plurality of subsystems is shown. A deteriorated subsystem is identified by the above-mentioned diagnosis method, using the signals output from the subsystems 901–904 input to the input part 101, and the diagnosis results are sent to each one of the subsystems 901–904 via the output part 111.

Figure 10:
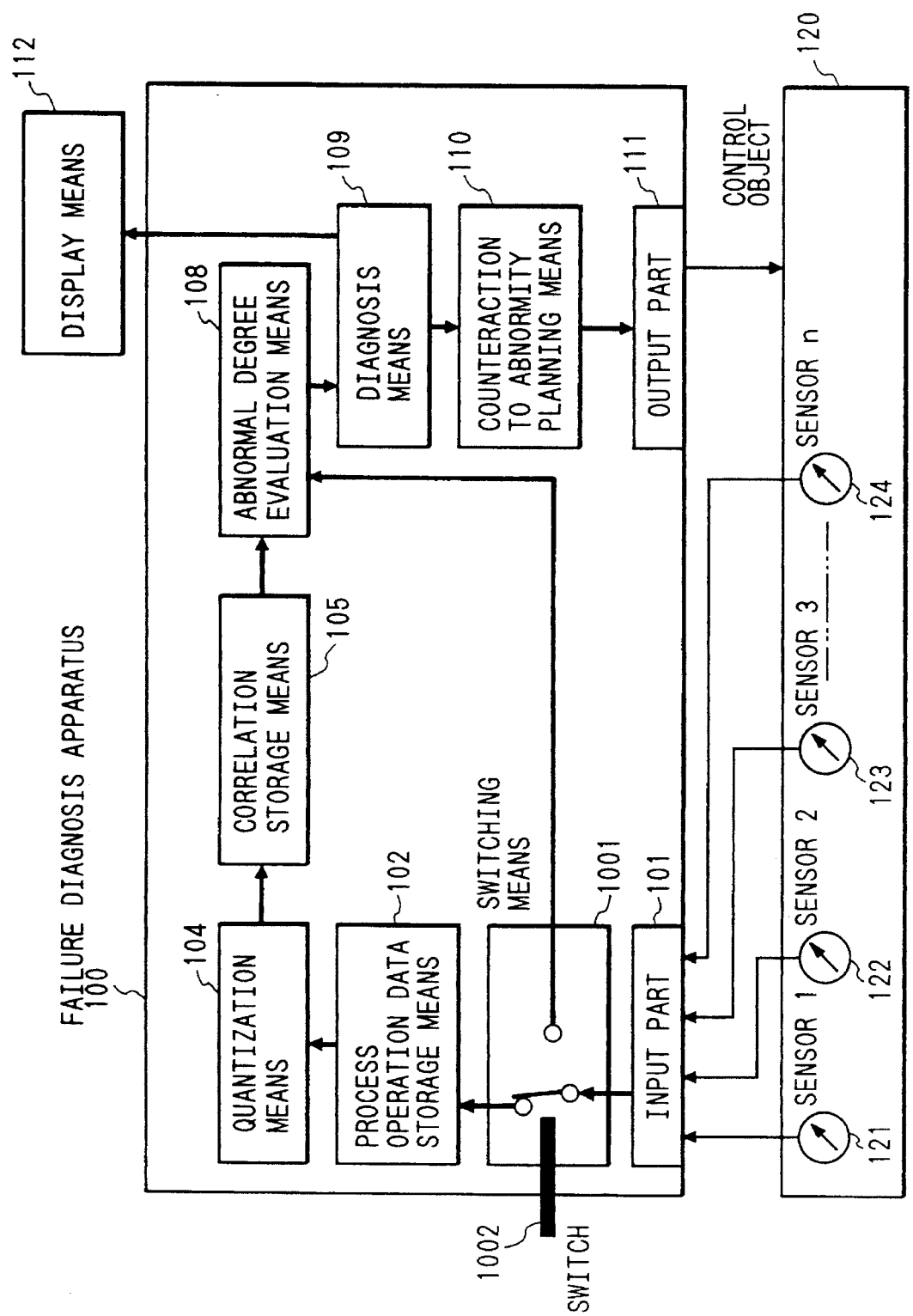
FIG. 10 shows an embodiment of a failure diagnosis apparatus having a switching means for changing the process modes.

FIG. 10 shows a further embodiment wherein the failure diagnosis apparatus has a mode switching means 1001 with a switch 1002 for switching from the first process mode of processing the output signals from the sensors until establishing the correlation storage means 105 to the second process mode of diagnosing the sensors and planning the counteractions to the sensor abnormity by using the processed results in the correlation storage means 105, which is installed in the output side of the input part 101. The timing of switching can be set also from outside the apparatus. For example, the process mode is adequately changed from the first process mode to the second process mode after the correlation storage means 105 is established with high accuracy.

By the present invention, correlations latent among sensors can be efficiently extracted and reliability of each sensor is evaluated by totally utilizing the correlations. Then, abnormal output signals due to aged deterioration can be diagnosed and the reliability of a control system is improved thereby. The present invention is effective in case a check or exchange of the deteriorated sensors is difficult, particularly of such sensors as ones for measuring the inside states of a smelting furnace.

What is claimed is:

1. A failure diagnosis apparatus, comprising:
   a memorizing means for storing process operation signals output from a plurality of sensors provided at a control object;
   a quantization means for making up a group of quantization vectors representing correlations among said process operation signals from each predetermined group of sensors by using said process operation signals stored in said memorizing means;
   a correlation memorizing means for storing said group of quantization vectors corresponding to each group of said sensors; and
   an abnormal degree evaluation means for obtaining an abnormal degree of each group of said sensors by comparing present process operation signals from each group of said sensors and said group of quantization vectors corresponding to each group of said sensors.

2. A failure diagnosis apparatus according to claim 1, further comprising a diagnosis means for diagnosing a reliability of each of said sensors based on said abnormal degrees obtained by said abnormal degree evaluation means.

3. A failure diagnosis apparatus according to claim 2, further comprising a counteraction planning means for controlling said control object based on diagnosis results judged by said diagnosis means.

4. A failure diagnosis apparatus according to claim 2, wherein each group of said sensors consists of a pair of said sensors.

5. A failure diagnosis apparatus according to claims 1, 2, 3 or 4, wherein said quantization means comprises at least one pair of a correlation network and a quantization processing means, said correlation network having an input layer to which process operation signals from each group of said sensors and a constant value are input and a quantization neuron layer consisting of a plurality of quantization neurons, each of said quantization neurons corresponding to each vector of said group of quantization vectors, and said quantization processing means renovating weights of synapses connecting neurons of said input layer and neurons of said quantization neuron layer to each other.

6. A failure diagnosis apparatus according to claims 1, 2, 3 or 4, wherein said abnormal degree evaluation means determines each of said abnormal degrees based on a distance between a state vector formed by present process operation signals from each group of sensors and a vector of said group of quantization vectors corresponding to each group of said sensors.

7. A failure diagnosis apparatus according to claims 2, 3 or 4, wherein said diagnosis means includes a diagnosis network which comprises units corresponding to said sensors and synapses connecting said units to each other, weights of said synapses being obtained by said abnormal degrees calculated by said abnormal degree evaluation means, and determines reliability of each one of said sensors.

8. A failure diagnosis method, comprising the steps of;
   grouping a plurality of sensors provided at a control object by a predetermining number of sensors;
   inputting process operation signals output from each group of sensors to a quantization network for extracting correlations among process operation signals from each group of said sensors in order to make said quantization network learn characteristics of said correlations;
   making up a group of quantization vectors representing said correlations among said process operation signals from each group of said sensors by using said quantization network; and
   obtaining an abnormal degree of each group of said sensors by comparing a set of present process operation signals from each group of said sensors and a vector of said group of quantization vectors corresponding to each group of said sensors.

9. A failure diagnosis method according to claim 8, further comprising the steps of:
   inputting said abnormal degrees to a diagnosis network, said diagnosis network comprising units corresponding to said sensors and synapses connecting said units to each other, weights of said synapses being obtained by said abnormal degrees; and
   determining abnormal sensors in said sensors by minimizing a total energy of said diagnosis network.

10. A failure diagnosis method according to claim 9, wherein each group of said sensors consists of a pair of said sensors.

11. A failure diagnosis method according to claims 8, 9 or 10, wherein the step of making up said group of quantization vectors utilizes at least one pair of a correlation network and a quantization processing means, said correlation networks having an input layer to which process operation signals from each group of said sensors and a constant value are input and a quantization neuron layer consisting of a plurality of quantization neurons, each of said quantization neurons corresponding to each vector of said group of quantization vectors, and said quantization processing means renovating weights of synapses connecting neurons of said input layer and neurons of said quantization neuron layer.

12. A failure diagnosis method according to claims 8, 9 or 10, wherein the step of obtaining an abnormal degree determines said each abnormal degree based on a distance between a state vector formed by present process operation signals from each group of said sensors and a vector of each group of quantization vectors corresponding to each group of said sensors.

* * * * *